(12) United States Patent
ALshunaifi et al.

(10) Patent No.: US 11,867,058 B2
(45) Date of Patent: Jan. 9, 2024

(54) HIGH POWER LASER-ENABLERS FOR HEATING/FRACTURING STIMULATION TOOL AND METHODS THEREFOR

(71) Applicant: SAUDI ARABIAN OIL COMPANY, Dhahran (SA)

(72) Inventors: Faisal Mustafa ALshunaifi, Dhahran (SA); Sameeh Issa Batarseh, Dhahran Hills (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 645 days.

(21) Appl. No.: 17/067,123

(22) Filed: Oct. 9, 2020

(65) Prior Publication Data
US 2022/0112772 A1 Apr. 14, 2022

(51) Int. Cl.
*E21B 7/15* (2006.01)
*B23K 26/144* (2014.01)
(Continued)

(52) U.S. Cl.
CPC ............... *E21B 7/15* (2013.01); *B23K 26/14* (2013.01); *B23K 26/144* (2015.10);
(Continued)

(58) Field of Classification Search
CPC .................................... E21B 7/14; E21B 7/15
See application file for complete search history.

(56) References Cited

U.S. PATENT DOCUMENTS 4,708,752 A 11/1987 Kar
5,889,587 A * 3/1999 D'Silva .................... E21B 7/15
356/316
(Continued)

FOREIGN PATENT DOCUMENTS

CN 203081295 U 7/2013
CN 203334954 U 12/2013
(Continued)

OTHER PUBLICATIONS

Batarseh, Sameeh I. et al., "High Power Laser Technology in Downhole Applications, Reshaping the Industry", SPE-188507-MS, Society of Petroleum Engineers, Nov. 2017 (15 pages).
(Continued)

*Primary Examiner* — Kenneth L Thompson
(74) *Attorney, Agent, or Firm* — Osha Bergman Watanabe & Burton LLP (57) ABSTRACT

Some embodiments may be directed to a drilling tool for drilling in a formation. This drilling tool may include an optical fiber having a laser input end and a laser output end and a laser source optically connected to the laser input end. Further, the drilling tool may include an activating agent conduit having an activating agent inlet and an activating agent outlet and an activating agent source connected to the activating agent inlet that supplies an activating agent. Finally, the drilling tool may include a drill head. In some embodiments, the drill head may include a nozzle connected to the activating agent outlet that discharges the activating agent on an area of the formation, and a laser head optically connected to the laser output end and arranged to lase at least a portion of the area of the formation having the activating agent.

19 Claims, 9 Drawing Sheets

(51) Int. Cl.
*B23K 26/146* (2014.01)
*B23K 26/382* (2014.01)
*B23K 26/14* (2014.01)
*B23K 103/00* (2006.01)

(52) U.S. Cl.
CPC .......... *B23K 26/146* (2015.10); *B23K 26/382* (2015.10); *B23K 2103/50* (2018.08)

(56) References Cited

U.S. PATENT DOCUMENTS

| | | | |
|---|---|---|---|
| 6,755,262 B2 | 6/2004 | Parker | |
| 6,880,646 B2 | 4/2005 | Batarseh | |
| 6,888,097 B2 | 5/2005 | Batarseh | |
| 9,074,422 B2* | 7/2015 | Grubb | B23K 26/1464 |
| 9,085,050 B1* | 7/2015 | Zediker | E21B 33/03 |
| 9,168,612 B2* | 10/2015 | Wilkiel | B23K 26/1476 |
| 10,221,667 B2* | 3/2019 | Montaron | E21B 29/00 |
| 10,385,668 B2 | 8/2019 | Batarseh | |
| 10,655,401 B2* | 5/2020 | Azar | E21B 10/62 |
| 2010/0078414 A1* | 4/2010 | Perry | B23K 26/382 |
| | | | 175/11 |
| 2012/0067643 A1* | 3/2012 | DeWitt | E21B 7/14 |
| | | | 175/65 |
| 2012/0074110 A1* | 3/2012 | Zediker | E21B 10/60 |
| | | | 219/121.72 |
| 2014/0008124 A1* | 1/2014 | Ma | E21B 27/00 |
| | | | 175/17 |
| 2014/0231147 A1* | 8/2014 | Bozso | E21B 7/061 |
| | | | 175/73 |
| 2016/0251940 A1 | 9/2016 | De Witt et al. | |
| 2018/0266183 A1 | 9/2018 | Ayub | |
| 2020/0048967 A1 | 2/2020 | Batarseh | |

FOREIGN PATENT DOCUMENTS

| | | |
|---|---|---|
| CN | 104563885 A | 4/2015 |
| CN | 107448174 A | 12/2017 |
| CN | 107339084 B | 3/2020 |
| WO | 2010/036318 A1 | 4/2010 |
| WO | 2013/023020 A1 | 2/2013 |

OTHER PUBLICATIONS

International Search Report and Written Opinion of the International Searching Authority issued in corresponding International Application No. PCT/US2021/053872, dated Jan. 18, 2022 (13 pages).

* cited by examiner

HIGH POWER LASER-ENABLERS FOR HEATING/FRACTURING STIMULATION TOOL AND METHODS THEREFOR

BACKGROUND

Wellbore stimulation is a branch of petroleum engineering focused on ways to enhance the flow of hydrocarbons from a formation to the wellbore for production. To produce hydrocarbons from the targeted formation, the hydrocarbons in the formation need to flow from the formation to the wellbore in order to be produced and flow to the surface. The flow from the formation to the wellbore may depend on formation permeability. When formation permeability is low, stimulation is applied to enhance the flow. Stimulation can be applied around the wellbore and into the formation to build a network in the formation.

One method of well-bore stimulation uses a downhole laser tool to penetrate and ablate a hydrocarbon bearing formation. In such a system, a laser surface unit excites energy to a level above the sublimation point of a hydrocarbon bearing formation to form a high power laser beam. This high powered laser beam is transmitted from the laser surface unit to the desired downhole location via optic fiber. At the downhole end of the optical fiber, the laser beam enters a drill head, which directs and focuses the high power laser beam. Finally, the high power laser beam is discharged from the transformer to ablate the intended hydrocarbon bearing formation.

SUMMARY

Some embodiments may be directed to a drilling tool for drilling in a formation. This drilling tool may comprise an optical fiber having a laser input end and a laser output end and a laser source optically connected to the laser input end. Further, the drilling tool may comprise an activating agent conduit having an activating agent inlet and an activating agent outlet and an activating agent source connected to the activating agent inlet that supplies an activating agent. Finally, the drilling tool may comprise a drill head. In some embodiments, the drill head may comprise a nozzle connected to the activating agent outlet that discharges the activating agent on an area of the formation, and a laser head optically connected to the laser output end and arranged to lase at least a portion of the area of the formation having the activating agent.

In some embodiments, the activating agent may increase energy absorption of the portion of the area of the formation when lased.

In some embodiments, the activating agent may comprise an activating material having at least one of a dark color, a high porosity, a high surface area, a small particle size, a high optical absorption, or a low optical reflectivity.

In some embodiments, the activating agent may comprise an activating material, the activating material comprising at least one of activated carbon, graphite, carbon black, carbon nanotubes, nanoparticles, paint, dye, molybdenum disulfide, a transition metal chalcogenide, or a metamaterial.

In some embodiments, the activating agent may further comprise a transport fluid, such that the transport fluid and the activating material are mixed prior to entering the activating agent inlet.

In some embodiments, the transport fluid may comprise at least one of water, brine, liquid adhesive, surfactant, acetone, ethanol, methanol, or isopropanol.

In some embodiments, the drilling tool may further comprise a carrying fluid conduit having a carrying fluid inlet and a carrying fluid outlet; and a carrying fluid source connected to the carrying fluid inlet that supplies a carrying fluid that carries the activating agent out the nozzle.

In some embodiments, the carrying fluid may comprise at least one of air, nitrogen, oxygen, argon, water, brine, liquid adhesive, surfactant, acetone, ethanol, methanol, or isopropanol.

In some embodiments, the drill head may further comprise an articulation module configured to direct the nozzle and the laser head toward the area of the formation.

In some embodiments, the drill head may further comprise a rotational module configured to direct the nozzle and the laser head toward the area of the formation.

In some embodiments, the rotational module may have an axis of rotation that lies in a plane dividing the drill head into a first half and a second half. In some embodiments, the nozzle may be disposed on the first half, and the laser is disposed on the second half.

Some embodiments may be directed to a method for drilling in a formation using an activating agent and a laser. In some embodiments, the method may comprise: inserting a drill head into a wellbore; advancing the drill head to an area of the formation; discharging an activating agent on the area of the formation using a nozzle in the drill head; and lasing at least a portion of the area of the formation using a laser head in the drill head.

In some embodiments, the method may further comprise maneuvering the drill head so the nozzle is directed toward the area of the formation.

In some embodiments, discharging the activating agent may further comprise rastering the nozzle while discharging the activating agent from the nozzle.

In some embodiments, discharging the activating agent may further comprise maneuvering the drill head.

In some embodiments, the method may further comprise maneuvering the drill head so the laser head is directed toward the area of the formation.

In some embodiments, lasing at least the portion of the area of the formation may further comprise rastering the laser head while lasing.

In some embodiments, lasing at least the portion of the area of the formation may further comprise maneuvering the drill head.

In some embodiments, the method may further comprise supplying a carrying fluid to an activating agent source located in a vicinity of the drill head such that the carrying fluid carries the activating agent from the activating agent source out the nozzle.

In some embodiments, the method may further comprise supplying a carrying fluid to an intermediate opening defined in an activating agent conduit such that the carrying fluid carries the activating agent from proximate to the intermediate opening out the nozzle.

Other aspects and advantages of the invention will be apparent from the following description and the appended claims.

BRIEF DESCRIPTION OF DRAWINGS

Throughout the figures, similar numbers are typically used for similar components.

In the figures, down is toward or at the bottom and up is toward or at the top of the figure. "Up" and "down" are generally oriented relative to a local vertical direction. However, as used throughout this disclosure, the terms "upflow" and "downflow" may refer to a position relative to the general direction of process or fluid flow, with upflow indicating a direction or position closer to start of the process and downflow referring to the direction or position closer to the end of the process. One of ordinary skill in the art would readily understand that an object or a process may be upflow or downflow of another object or process while having no general relation to the position relative to vertical orientation unless otherwise specifically stated.

DETAILED DESCRIPTION

While lasing with high power laser energy may produce a sudden increase in temperature in some formations from the original reservoir temperature to 2000° C., other formations may only reach 880° C. Importantly, lower temperatures may be insufficient to sublime a rock formation and thus stimulate the wellbore production.

The maximum temperature achieved in a formation reflects the amount of laser energy absorbed by a given rock. While many factors contribute to the amount of laser energy absorbed by a formation, the primary factor is the color of the formation. To that end, brighter colored surfaces reflect a larger fraction of the incident laser light than do darker colored surfaces.

In order to enhance the amount of laser energy absorbed by a formation, this disclosure provides a method and a device for first spraying an area of a formation with an activating agent that increases the absorption and then lasing that area of the formation now coated with the activating agent.

Figure 1:
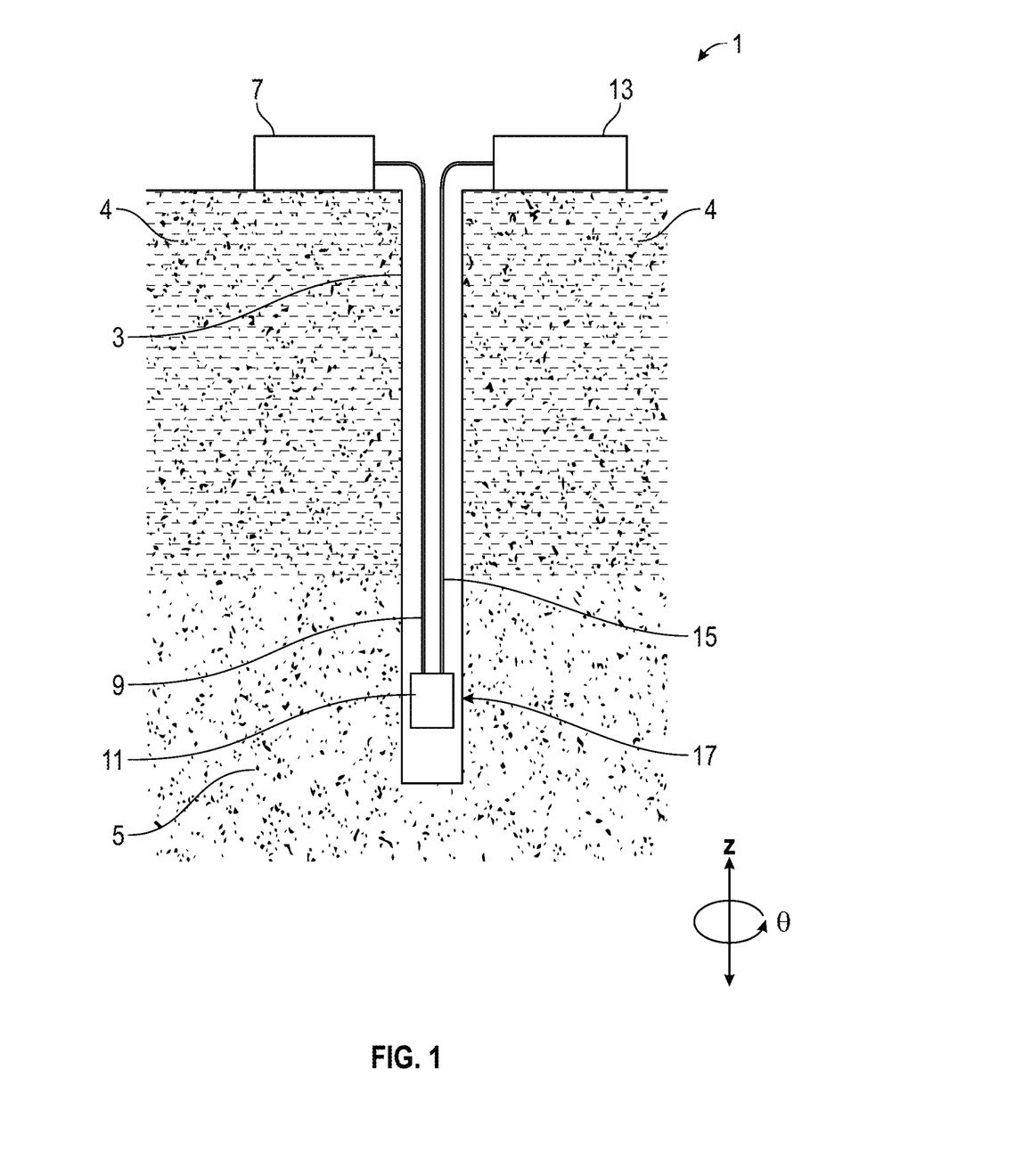
FIG. 1 depicts a schematic of a drilling tool according to one or more embodiments.

FIG. 1 depicts one or more embodiments of a drilling tool 1 located in a wellbore 3 that includes a formation 5.

Drilling tool 1 includes an activating agent source 7 connected to activating agent conduit 9 that ends in a drill head 11. An activating agent is stored in activating agent source 7 and delivered to drill head 11 via activating agent conduit 9.

Drilling tool 1 also includes laser source 13 connected to optical fiber 15 that ends in drill head 11. Drill head 11 is located so it can interact with an area 17. A laser is generated in laser source 13 and delivered to drill head 11 via optical fiber 15.

Activating agent source 7 and laser source 13 are located above surface 4 of wellbore 3.

Laser source 13 may generate a high power laser (for example, a laser having an output power of at least 10 kW, at least 20 kW, at least 100 kW, or in the megawatt range). Optical fiber 15 may be a fiber optic cable configured to transmit the high power laser light. Optical fiber 15 may transmit laser light between laser source 13 and drill head 11. Given the depth of wellbore 3, optical fiber 15 may be many kilometers meters long, such as 5 km, 20 km, or greater.

As discussed previously, an activating agent may be used to improve the laser absorption characteristics of a formation by increasing the energy absorption. In some embodiments, the activating agent may include an activating material. In some embodiments, the activating material may have a dark color, a high porosity, a high surface area, a small particle size, a high optical absorption, a low optical reflectivity, or a combination. In some embodiments, the activating material may be a solid or a liquid. In some embodiments, the activating material may be activated carbon, graphite, carbon black, carbon nanotubes, nanoparticles, paint, dye, molybdenum disulfide, a transition metal chalcogenide, a metamaterial, or a combination.

One illustrative example of an activating agent that includes only an activating material is dye. In drilling tool 1 as depicted in FIGS. 1 and 2, dye (the activating material) is stored at the surface 4 in the activating agent source 7, flows down activated agent conduit 9, and is ejected from nozzle 21.

In some embodiments, the activating agent may include both an activating material and a transport fluid. In some embodiments, the activating material may be mixed with and transported from activating agent source 7 through activating agent conduit 9 and out nozzle 21 by a transport fluid. In some embodiments, the transport fluid may include a liquid such as water, brine, liquid adhesive, surfactant, acetone, ethanol, methanol, isopropanol, or a combination. In some embodiments, the transport fluid may be viscus, sticky, or both to aid the attachment of the activating agent to area 17 within wellbore 3. In some embodiments, the activating agent may also include one or more additives such as surfactants, viscosifiers, wetting agents, emulsifiers, and others.

One illustrative example of an activating agent comprised of a transport fluid and an activating material is activated carbon (the activating material) in water (the transport fluid). As mentioned previously, such a mixture may also include one or more additive, such as a surfactant to help keep the activated carbon suspended in the water. In FIGS. 1 and 2, such an activated carbon/water mixture would be stored at the surface 4 in the activating agent source 7, flow down activated agent conduit 9, and is ejected from nozzle 21.

Figure 2:
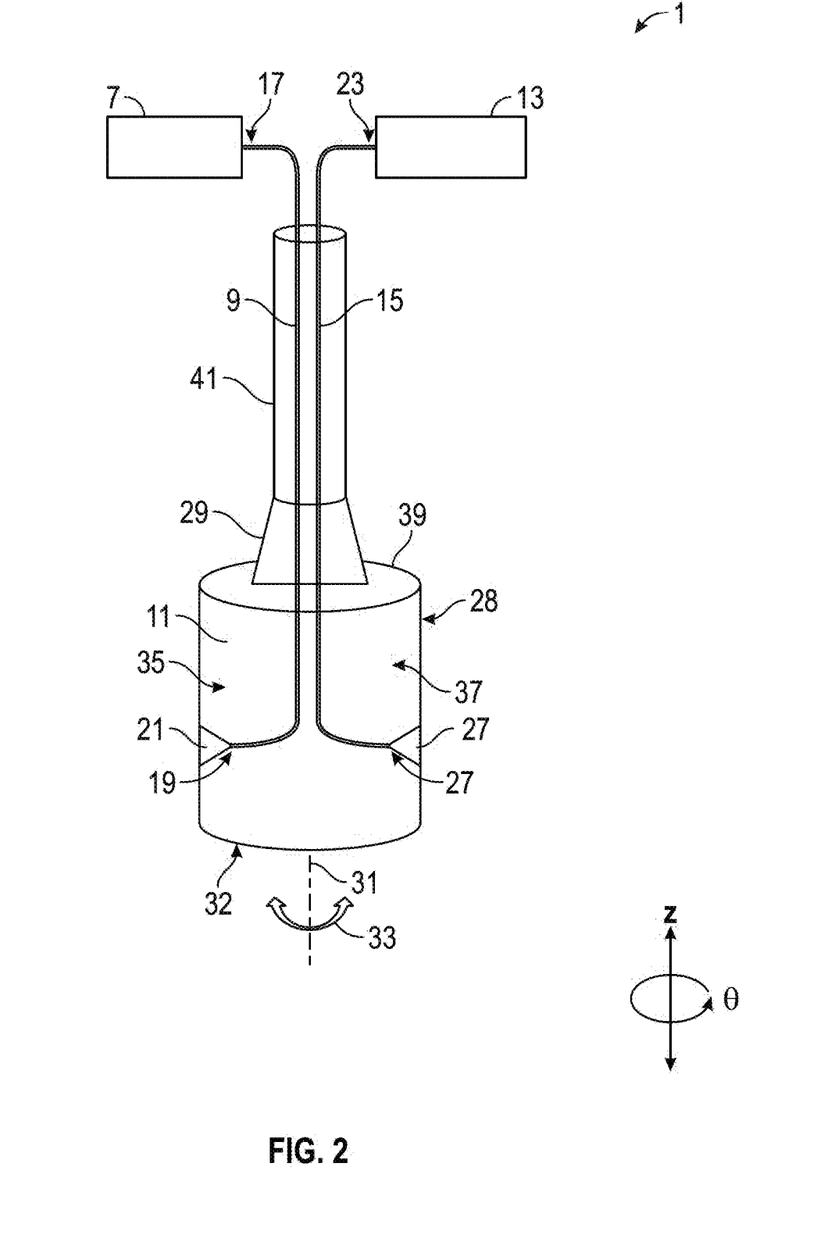
FIG. 2 depicts a schematic of a drilling tool according to one or more embodiments.

FIG. 2 depicts a cross section of the drilling tool 1 depicted in FIG. 1 according to one or more embodiments.

Activating agent conduit 9 includes an activating agent inlet 17 connected to activating agent source 7 and an activating agent outlet 19 fluidly connected to a nozzle 21 in drill head 11. Activating agent conduit 9, thus, connects activating agent source 7 to nozzle 21 so activating agent may be ejected from nozzle 21.

Within nozzle 21, the activating agent may encounter one or more fluidic components known in the art. These fluid components may include one or more components (for example, pumps, conduits, inlets, outlets, sprayers, mixers, diffusers, and throats). These fluidic components may direct or pressurize the activating agent within nozzle 21 and/or upon emission from nozzle 21. In some embodiments, the activating agent may pass through one or more components within nozzle 21 to control the size and direction of the activating agent before or during emission from nozzle 21.

In some embodiments, the activating agent when emitted from nozzle 21 may have any spray pattern (for example, a solid stream, a mist, a fog, a flat fan, a twin flat fan, a hollow cone, a solid cone, or a spiral full cone), any spray angle/geometry (for example, wide or narrow), and any spray geometry (for example, round or oval), depending upon the application. In some embodiments, nozzle 21 may be configured to raster the activating agent as it is emitted from nozzle 21.

Similarly, optical fiber 15 includes a laser input end 23 connected to laser source 13 and a laser output end 25 connected to a laser head 27 in drill head 11. Optical fiber 15, thus, connects laser source 13 to laser head 27 so the laser may be emitted from laser head 27.

Within laser head 27, the laser may encounter one or more optical components known in the art. These optical components may direct or shape the laser. These optical components may include one or more transmissive component (for example, lenses, filters, windows, optical flats, prisms, polarizers, beamsplitters, wave plates, and additional optical fibers) or reflective component (for example, mirrors and retroreflectors). In some embodiments, the laser may pass through one or more lenses within laser head 27 to control the size and direction of the laser before or during emission from laser head 27. In some embodiments, the laser emitted from laser head 27 may be focused or collimated, depending upon the application. In some embodiments, laser head 27 may be configured to raster the laser as it is emitted from laser head 27.

In some embodiments, laser head 27, nozzle 21, or both may emit from drill head 11 on a radial side 28 of drill head 11.

Since wellbores are frequently not vertical (as in horizontal drilling), a z-direction as depicted here may be parallel to the downhole direction in a region of wellbore 3 near drill head 11. The spherical coordinates reference axis depicted here also includes theta Θ, the azimuthal angle perpendicular to the z-direction.

Drilling tool 1 also includes rotational module 29, which rotates drill head 11 around an axis of rotation 31 as indicated by arrow 33. Thus, rotational module 29 may change the azimuthal angle theta Θ of drill head 11. One having skill in the art will appreciate the well-known structures that may be included in rotational module 29.

Drilling head 11 may be manipulated in the z-direction using other means, such as by advancing/retracting drill tool 11 within wellbore 3 using equipment known in the art.

Axis of rotational 31 may be perpendicular to axial end 32 of drill head 11. Axis of rotation 31 may be parallel with the depicted z-direction. Arrow 33 may indicate rotation in the theta Θ direction.

Axis of rotation 31 may be located in a plane (not depicted) that divides drill head 11 into a first half 35 and a second half 37. In some embodiments, nozzle 21 may be located in first half 35 of drill head 11 and laser head 27 may be located in second half 37 of drill head 11. Rotational module 29 may be used to arrange drill head 11 such that nozzle 21 and laser head 27 can successively be directed toward the same area within a formation as described further.

In FIG. 2, nozzle 21 and laser head 27 are on opposing sides of drill head 11 such that an angle between nozzle 21 and laser head 27 is approximately 180°. Thus, nozzle 21 and laser head 27 emit an activating agent and a laser, respectively, in opposite directions. While drill head 11 is depicted as a cylinder in FIGS. 1-5, one having skill in the art will appreciate that drill head 11 may have any shape, including a cube, a rectangular prism, a cuboid, or a hexagonal prism.

In some embodiments, the angle between nozzle 21 and laser head 27 may be angles other than 180° in some embodiments (for example, 45°, 60°, 120°, 270°, or others). Additionally, some embodiments of drill head 11 may more than one nozzle 21 and/or more than one laser head 27. In such an embodiment, each nozzle 21/laser head 27 may be connected to a separate source or a single source may be divided and directed towards each nozzle 21/laser head 27 using a splitter known in the art.

A case 39 protects the components of drill head 11 from the environment present in wellbore 3. Similarly, a sheath 41 protects activating agent conduit 9 and optical fiber 15 from the environment present in wellbore 3. Additional modules of drilling tool 1 such as rotational module 29 may be within case 39 and/or sheath 41 or may include a protective covering and/or coating to protect from the environment present in wellbore 3.

Figure 3:
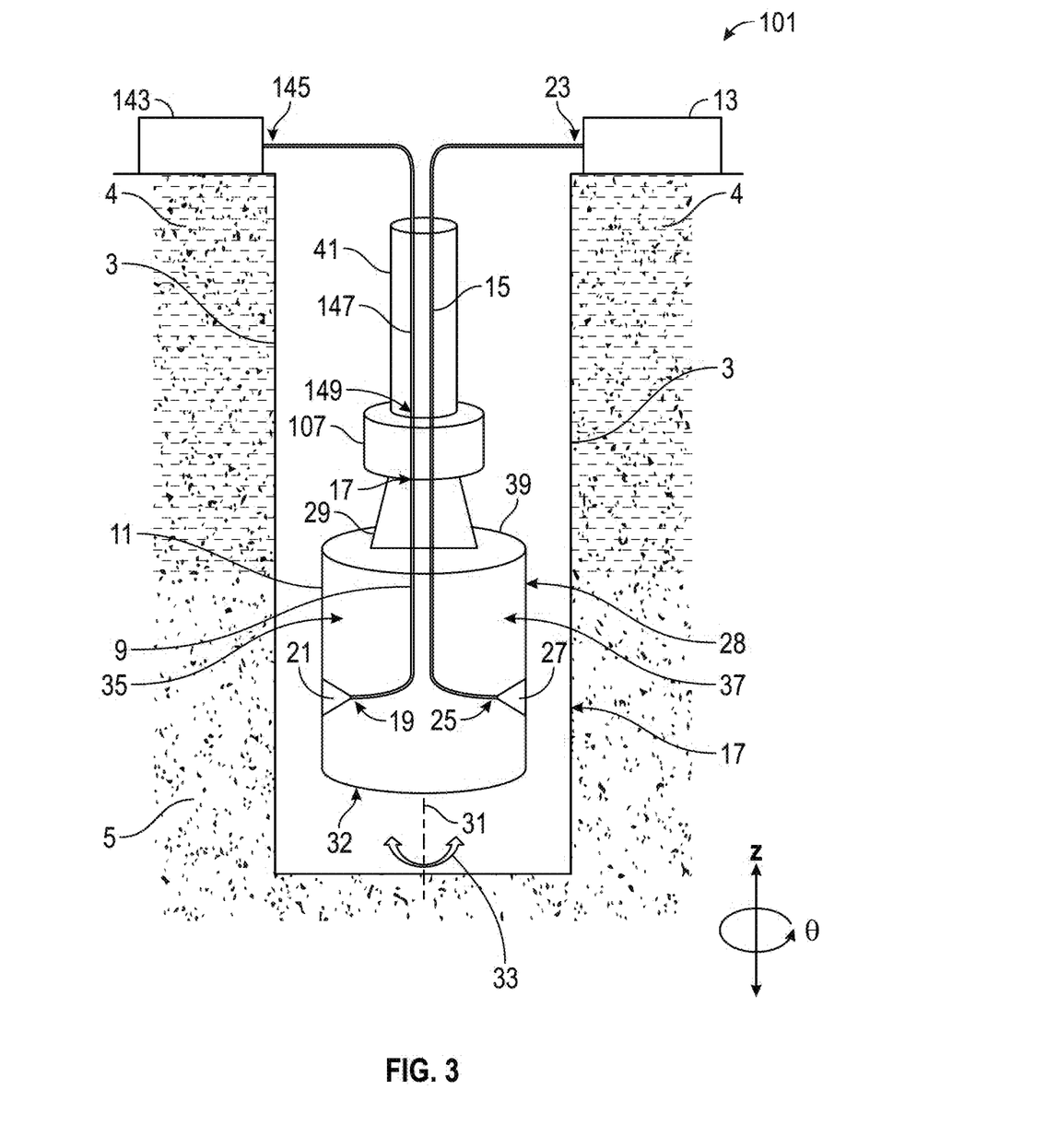
FIG. 3 depicts a schematic of a drilling tool according to one or more embodiments.

FIG. 3 depicts a cross-sectional schematic of a drilling tool 101 according to one or more embodiments. As in FIG. 2, laser source 13 connects to laser head 27 in drill head 11 via optical fiber 15.

In contrast with FIG. 2, activating agent source 107 is not located on surface 4 and is instead located near drill head 11. Specifically, activating agent source 107 is located atop rotational module 29 with rotational module 29 located atop drill head 11. In some embodiments, activating agent source 107 may be located within drill head 11 or in a component near drill head 11 such as within an adjacent or nearby sub.

Some embodiments, such as the embodiment depicted in FIG. 3, may employ a carrying fluid. This carrying fluid is used to carry the activating agent from activating agent source 107 out nozzle 21. The carrying fluid is stored in a carrying fluid source 143 located above surface 4. Carrying fluid flows from carrying fluid source 143 through a carrying fluid inlet 145, a carrying fluid conduit 147, and a carrying fluid outlet 149 and into activating agent source 107. Thus, the carrying fluid and the activating agent mix within activating agent source 107.

In some embodiments, the carrying fluid may be a liquid or a gas. In some embodiments, the carrying fluid may include water, brine, liquid adhesive, surfactant, acetone, ethanol, methanol, isopropanol, air, compressed air, nitrogen, oxygen, argon, or a combination. In some embodiments, the carrying fluid may be viscus, sticky, or both to aid the attachment of the activating agent to area 17 within wellbore 3. In some embodiments, the carrying fluid may also include one or more additives such as surfactants, viscosifiers, wetting agents, emulsifiers, and others to enhance the ability of the activating agent to be mixed with the carrying fluid.

One illustrative example of a carrying fluid and an activating agent is a combination of water (the carrying fluid) and activated carbon (the activating material). Here, water is being employed as a carrying fluid and not as a transport fluid as discussed in a previous example. In FIG. 3, water (the carrying fluid) is stored in carrying fluid source 143 above surface 4 while activated carbon (the activating material) is stored in activated agent source 107 near drill head 11. Thus, water (the carrying fluid) would flow down carrying fluid conduit 147 to activated agent source 107. Within activated agent source 107, water (the carrying fluid) and activated carbon (the activating material) mix. Thus, a mixture of water and activated carbon flows down activating agent conduit 9 and the mixture is sprayed out nozzle 21.

One having skill in the art will appreciate how, in such an embodiment, activating agent source 107 may include one or more components (for example, blenders, mixers, aerosolizers, and on) to improve the mixing of carrying fluid and activating agent.

Figure 4:
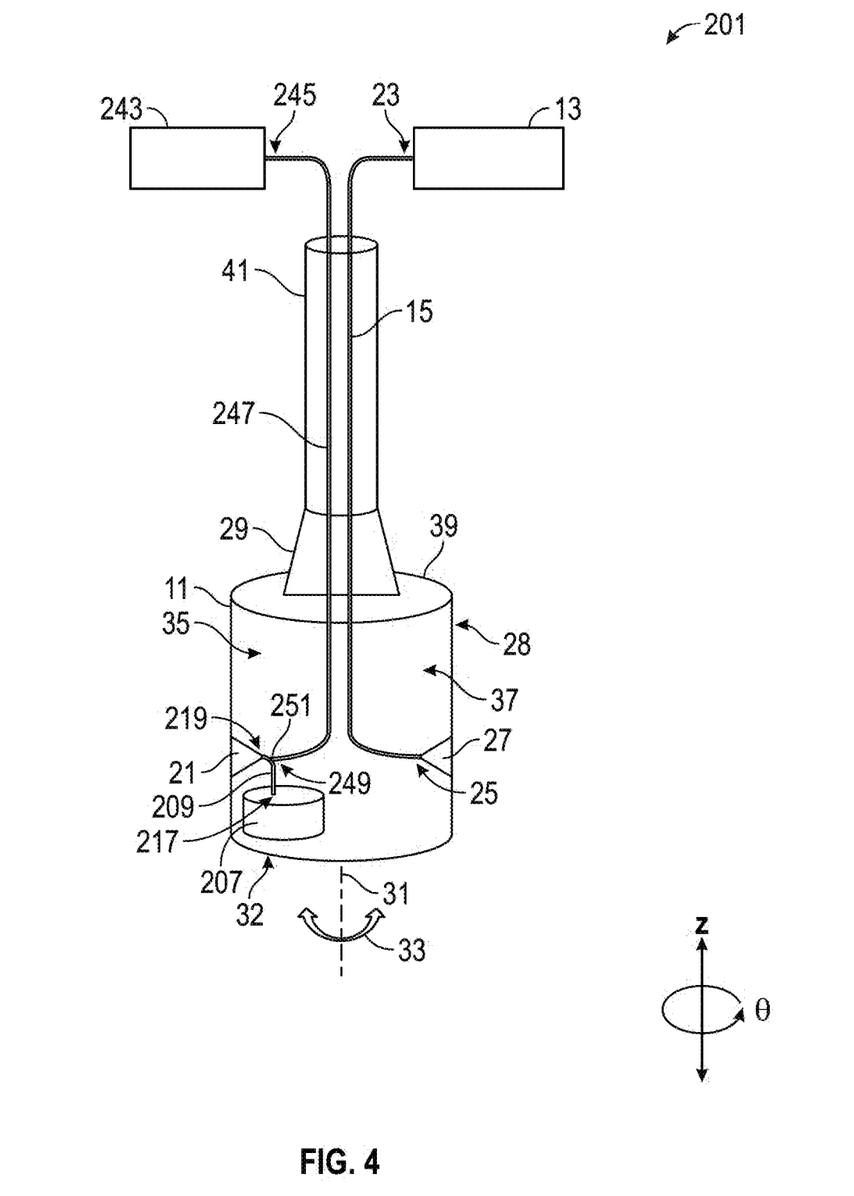
FIG. 4 depicts a schematic of a drilling tool according to one or more embodiments.

FIG. 4 depicts a further embodiment of drilling tool 201 having a different configuration for activating agent source 207 and where carrying fluid and activating agent mix within activating agent conduit 209.

In FIG. 4, activating agent source 207 is located within drill head 11 and vertically below nozzle 21. In some embodiments, activating agent source 207 may be located anywhere within drill head 11, including vertically above nozzle 21, level with nozzle 21, or below nozzle 21. In such an embodiment, activating agent conduit 209 may include an additional component such as a wicking material conduit or a pump to move the activating agent vertically, toward nozzle 21, or both.

As before, activating agent conduit 209 is connected to an activating agent source 207 via an activating agent inlet 217 and is connected to nozzle 21 with an activating agent outlet 219. Additionally, a carrying fluid is stored in a carrying fluid source 243, moves into a carrying fluid inlet 245, through a carrying fluid conduit 247 and out a carrying fluid outlet 249.

However, in FIG. 4, the carrying fluid and the activating agent mix upflow from nozzle 21 at the intersection of activating agent conduit 209 and carrying fluid conduit 247. Specifically, carrying fluid conduit 247 intersects with activating agent conduit 209 near nozzle 21. Thus, the carrying fluid exits carrying fluid conduit 247 via carrying fluid conduit 247, flowing into activating agent conduit 209 via an intermediate opening 251 defined by activating agent conduit 209 and located along the length of activating agent conduit 209. Thus, the carrying fluid picks up the activating agent within activating agent conduit 209 at or near intermediate opening 251 before being ejected out nozzle 21.

As discussed previously, some embodiments may utilize a carrying fluid and an activating agent. One illustrative example of this configuration in drilling tool 201 is compressed air (the carrying fluid) and dye (the activating material). In FIG. 4, compressed air (the carrying fluid) is stored in carrying fluid source 243 above surface 4 while dye (the activating material) is stored in activated agent source 207 within drill head 11. Thus, compressed air (the carrying fluid) flows down carrying fluid conduit 247 into activating agent conduit 209 via intermediate opening 251. Within activated agent conduit 209, compressed air mixes with dye (the activating material). Thus, compressed air propels dye out nozzle 21.

Some embodiments may include both a carrying fluid and an activating agent that includes both an activating material and a transport fluid. One illustrative example of this configuration is compressed air (the carrying fluid) and paint (the activating agent), which is a mixture of pigment (the activating material) and solvent (the transport fluid). In FIG. 4, compressed air (the carrying fluid) is stored in carrying fluid source 243 above surface 4 while paint (the activating agent) is stored in activated agent source 207 within drill head 11. Thus, compressed air (the carrying fluid) flows down carrying fluid conduit 247 into activating agent conduit 209 via intermediate opening 251. Within activated agent conduit 209, compressed air mixes with and/or picks up paint (the activating agent). Thus, compressed air propels paint out nozzle 21.

Figure 5:
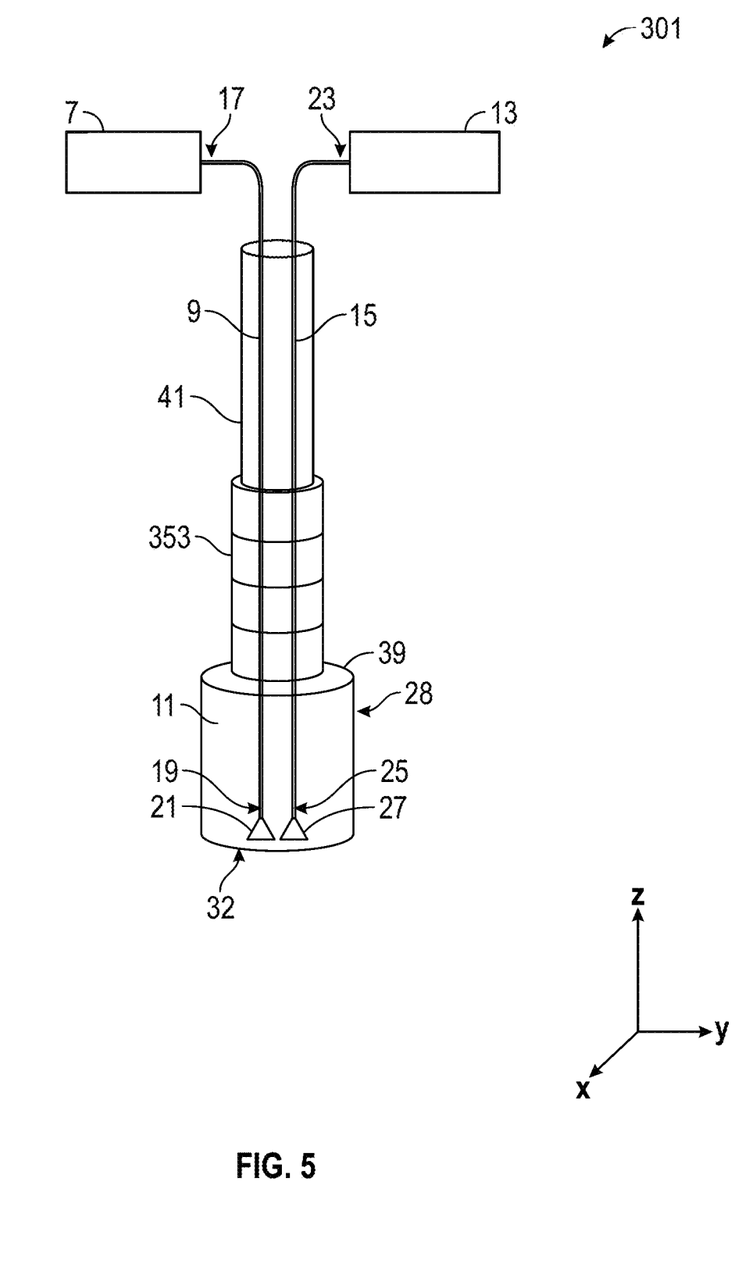
FIG. 5 depicts a schematic of a drilling tool according to one or more embodiments.

FIG. 5 depicts an embodiment of a drilling tool 301 having many components arranged similarly to drilling tool 1 as depicted in FIG. 2. However, in drilling tool 301, drill head 11 is manipulated with an articulation module 353 as opposed to a rotational module 29. Additionally, nozzle 21 and laser head 27 are located on an axial end 32 of drill head 11 and activating agent conduit 9 and optical fiber 15 are reconfigured appropriately.

In FIG. 5, articulation module 353 manipulates drill head 11 within the depicted x-y-z coordinate space. As discussed previously, since wellbores are frequently not vertical (as in horizontal drilling), the z-direction may be defined as parallel to the downhole direction in a region near drill head 11.

In some embodiments, articulation module 353 may manipulate drill head 11 in x-y-z space (meaning movement in the x, the y, and the z directions). In some embodiments, articulation module 353 may manipulate drill head 11 in x-y space, while manipulation in the z direction may be performed using alternative means (such as by advancing/retracting drill tool 11 within the wellbore using equipment known in the art). In some embodiments, drill head 11 may be grossly manipulated in the z-direction with said alternative means and finely manipulated in the z-direction using articulation module 353. One having skill in the art will appreciate the well-known structures that may be included in articulation module 353, such as a combination of joint(s) and micromotor(s).

One having skill in the art will appreciate how articulation module 353 may be readily incorporated into any drilling tool 1 of this disclosure. Additionally, a drilling tool 1 according to this disclosure may include both articulation module 353 and rotational module 29, such that drill head 11 may be rotated by rotational module 29 and articulated in x-y or x-y-z space by articulation module 353.

FIG. 5 depicts nozzle 21 and laser head 27 located on an axial end of drill head 11 in some embodiments, nozzle 21 and laser head 27 may be located on opposite radial sides 28 of drill head 11 as in FIGS. 2-4 and as described previously. In some embodiments having more than one nozzle 21, more than one laser head 27, or both, nozzles 21 and/or laser heads 27 may be located on any combinations of surfaces of drill head 11, including both axial end 32 and radial side 28.

Figure 6:
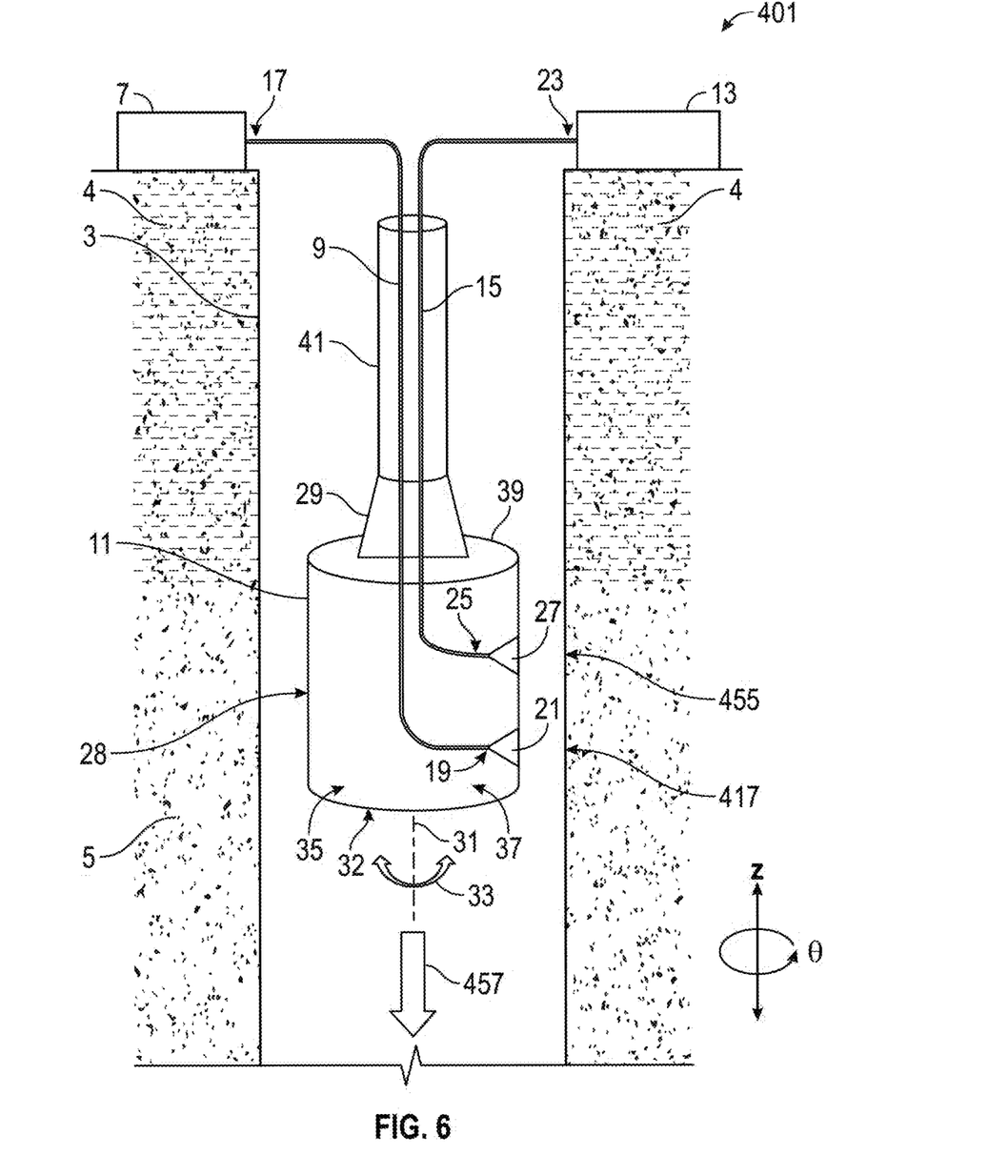
FIG. 6 depicts a schematic of a drilling tool according to one or more embodiments.

FIG. 6 depicts an embodiment of drilling tool 401 with laser head 27 and nozzle 21 both located in second half 37 of drill head 11. Additionally, laser head 27 is located radially above nozzle 21 on drill head 11.

Nozzle 21 is directed at a first area 417 of formation 5, while laser head 27 is directed at a second area 455 of formation 5. Thus, laser head 27 is currently positioned to laze at least a portion of second area 455 of formation 5. Furthermore, after drill head 11 moves downward within wellbore 5 as indicated by arrow 457, laser head 27 may be positioned to laze at least a portion of first area 417 of formation 5 after first area 417 has interacted with the activating agent.

Figure 7:
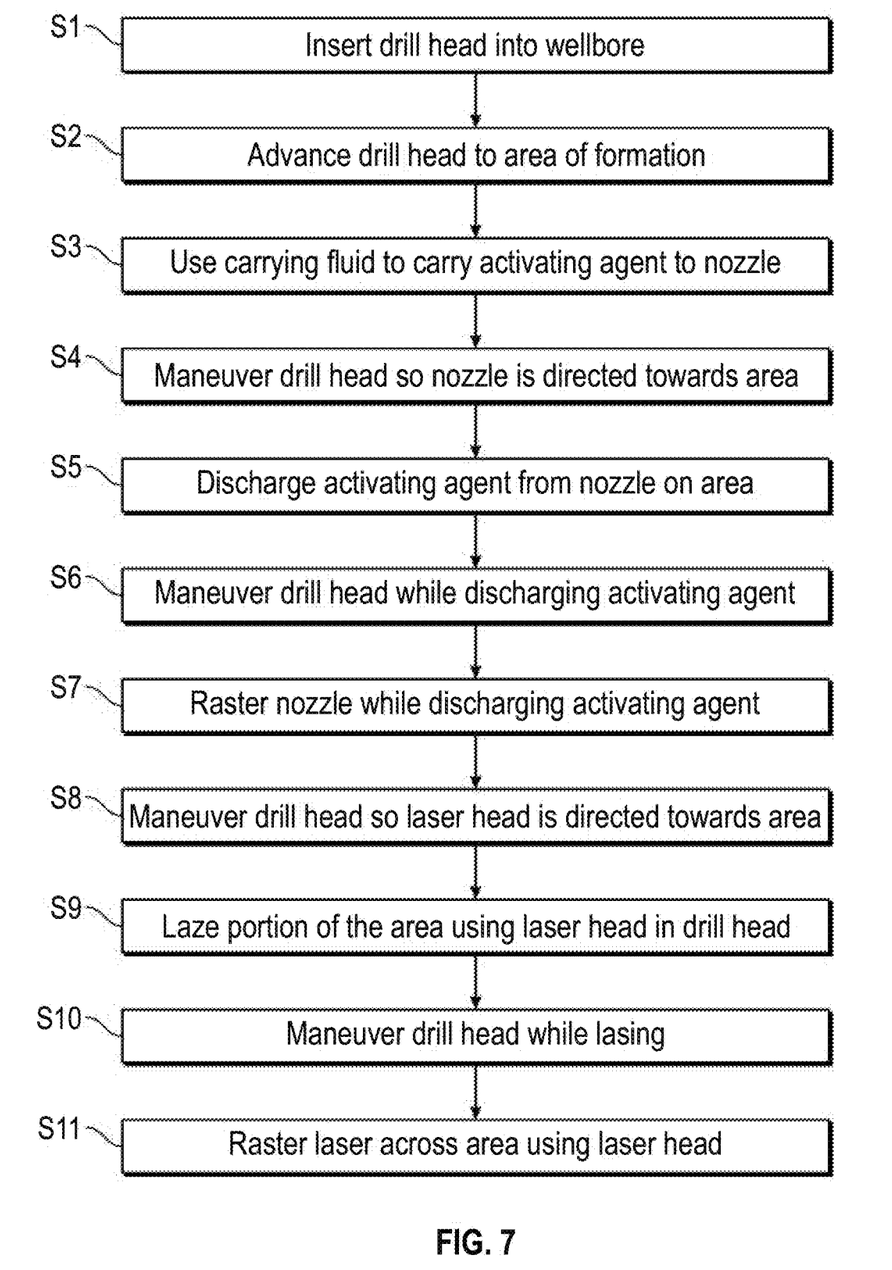
FIG. 7 depicts a flow chart of one or more embodiments of the method.

FIG. 7 is a flow chart depicting a method for drilling in formation 5 with a drilling tool (like drilling tool 1, 101, 201, 301, 401) that employs an activating agent and a laser. Not all depicted steps may be performed in all embodiments of this method.

Step S1 is inserting drill head 11 into wellbore 3.

In some embodiments, the method may include step S1. FIGS. 1 and 3 depict a drill head 11 after it has been inserted into wellbore 11.

Step S2 is advancing drill head 11 to area 17 of formation 5 within wellbore 3.

Some embodiments of the method may include step S2. FIGS. 1 and 3 depict a drill head 11 that has been advanced to area 17 of formation 5 within wellbore 11.

Some embodiments of the method may include step S3. Step S3 is using a carrying fluid to carry the activating agent to nozzle 21.

In some embodiments, drilling tool (like drilling tool 101, 201) includes a carrying fluid source 243 and carrying fluid conduit 247. Some embodiments of drilling tool (like drilling tool 101, 201) include a carrying fluid that mixes with an activating agent and carries the activating agent out nozzle 21. In some embodiments, the carrying fluid may mix with an activating agent that includes a transport fluid.

In some embodiments, such as in drilling tool 101 depicted in FIG. 3, the carrying fluid and the activating agent may mix within activating agent source 107. Thus, the carrying fluid may carry the activating agent from activating agent source 107 out the nozzle 21, in some embodiments.

In some embodiments, such as in drilling tool 201 depicted in FIG. 4, the carrying fluid and the activating agent may mix within activating agent conduit 209 near intermediate opening 251. Thus, the carrying fluid may carry the activating agent from activating agent conduit 209 near intermediate opening 251 out the nozzle 21, in some embodiments.

Some embodiments of the method may not include step S3, such as those that do not employ a carrying fluid.

Some embodiments of the method may include step S4. Step S4 is maneuvering drill head 11 so nozzle 21 is directed towards area 17 of formation 5.

Some embodiments of drilling tool (such as drilling tool 1, 101, 201, 301, 401) include one or more mechanisms for manipulating drill head 11. Some embodiments, such as drilling tool 1, 101, 201, 401 depicted in FIGS. 1-4, include rotational module 29. Some embodiments, such as drilling tool 301 depicted in FIG. 5, include articulation module 353. Some embodiments of the method may include maneuvering drill head 11 using rotational module 29, articulation module 353, or both. Some embodiments of the method may include advancing/retracting drill tool 11 using structures (not depicted) above surface 4 of wellbore 3. Such maneuvering may position drill head 11 so that nozzle 21 is directed towards area 17 of formation 5.

In some embodiments, this maneuvering may include one or more of rotation in theta $\Theta$ (as with rotational module 29), translation in x-y space or x-y-z space (as with articulation module 353), or advancing/retracting drill tool 11 in the z-direction (as with structures above surface 4 of wellbore 3). In some embodiments, once maneuvering is completed, nozzle 21 may be directed toward area 17 of formation 5.

Some embodiments of the method may not include step S4, such as those where drilling tool 1 lacks manipulation components (such as rotational module 29 or articulation module 353); where manipulation occurs while the activating agent is being discharged from nozzle 21 (as in step S6); or where advancing drill head 11 to area 17 of formation 5 (as in step S2) places nozzle 21 toward area 17 of formation 5.

Step S5 is discharging the activating agent on area 17 of formation 5 using nozzle 21. As discussed previously, upon discharge from nozzle 21, the activating agent may be mixed with a carrying fluid. Further, the activating agent may include an activating material, a transport fluid, or both. Thus, in some embodiments, nozzle 21 may discharge the activating agent including the activating material along with the carrying fluid, the transport fluid, or both.

As discussed further, in some embodiments, the activating agent may be discharged from nozzle 21 while drill head 11 is maneuvered (as in step S6), while nozzle 21 is rastered (as in step S6), or both.

Some embodiments of the method may include step S6. Step S6 is maneuvering drill head 11 while discharging the activating agent.

In some embodiments, drill head 11 may be maneuvered while discharging the activating agent from nozzle 21. In some embodiments, maneuvering drill head 11 during discharge of the activating agent may increase the size of area 17 of formation 5 exposed to the activating agent. In some embodiments, this maneuvering may include one or more of rotation in theta $\Theta$ (as with rotational module 29), translation in x-y space or x-y-z space (as with articulation module 353), or advancing/retracting drill tool 11 in the z-direction (as with structures above surface 4 of wellbore 3).

Some embodiments of the method may not include step S6, such as those where drilling tool 1 lacks manipulation components (such as rotational module 29 or articulation module 353); those that include multiple nozzles 21 in drill head 11; those where nozzle 21 rasters the discharge of the activating agent; or those where discharge is performed from a static drill head 11 including those where discharging and maneuvering are performed in a stepwise fashion (meaning: maneuver, discharge, maneuver, discharge, and on).

Some embodiments of the method may include step S7. Step S7 is rastering nozzle 21 while discharging the activating agent.

In some embodiments, nozzle 21 may be rastered while discharging the activating agent. In some embodiments, rastering may discharge the activating agent from nozzle 21 in any shape or pattern. In some embodiments, this rastering may be performed by any structure within nozzle 21. In some embodiments, rastering nozzle 21 during discharge of the activating agent may increase the size of area 17 of formation 5 exposed to the activating agent.

Some embodiments of the method may not include step S7, such as those where nozzle 21 is unable to raster the discharge of the activating agent; those that include multiple nozzles 21 in drill head 11; those where drill head 11 is manipulated before or during the discharge of activating agent; or those where discharge is performed from a static drill head 11 including those where discharging and maneuvering are performed in a stepwise fashion (meaning: maneuver, discharge, maneuver, discharge, and on).

In some embodiments, steps S6 and S7 may be performed simultaneously. Thus, in some embodiments, nozzle 21 may raster the discharge of the activating agent while drill head 11 is being manipulated.

In some embodiments, one or more of steps S4, S5, S6, or S7 may be performed in any order. In some embodiments, one or more of steps S4, S5, S6, or S7 may be repeated in any order.

As an illustrative example, one or more embodiments of the method may involve: maneuvering drill head 11 so nozzle 21 is directed towards area 17 (as in step S4); begin discharging the activating agent from nozzle 21 onto area 17 while drill head 11 is stationary (as in step S5); rastering nozzle 21 while discharging the activating agent on area 17 (as in step S7); maneuvering drill head 11 so nozzle 21 is directed towards a second area (as in step S4); begin discharging the activating agent from nozzle 21 onto a second area while drill head 11 is stationary (as in step S5); rastering nozzle 21 while discharging the activating agent on the second area (as in step S7); and on.

As a second illustrative example, one or more embodiments of the method may involve: maneuvering drill head 11 so nozzle 21 is directed towards area 17 (step S4), rotating drill head 11 in theta $\Theta$ while discharging (step S6), and rastering nozzle 21 parallel to z-direction while discharging (step S7). Here, as in some embodiments, drill head 11 rotates while nozzle 21 simultaneously rasters the discharge from nozzle 21, which may increase the size of area 17.

Thus, one having skill in the art will appreciate how any of steps S4, S5, S6, and S7 may be reordered, repeated, and/or combined to introduce the activating agent to area 17 of formation 5 as desired for a given application.

Some embodiments of the method may include step S8. Step S8 is maneuvering drill head 11 so laser head 27 is directed towards area 17.

Some embodiments of the method may include maneuvering drill head 11 using rotational module 29, articulation module 353, or both. Some embodiments of the method may include advancing/retracting drill tool 11 using structures (not depicted) above surface 4 of wellbore 3. Such maneuvering may position drill head 11 so that laser head 27 is directed towards area 17 of formation 5 that previously was introduced to the activating agent.

In some embodiments, this maneuvering may include one or more of rotation in theta Θ (as with rotational module 29), translation in x-y space or x-y-z space (as with articulation module 353), or advancing/retracting drill tool 11 in the z-direction (as with structures above surface 4 of wellbore 3). In some embodiments, once maneuvering is completed, laser head 27 may be directed toward area 17 of formation 5.

Some embodiments of the method may not include step S8, such as those where drilling tool 1 lacks manipulation components (such as rotational module 29 or articulation module 353); where laser head 27 and nozzle 21 are configured to interact with the same area 17 (as with drilling tool 301); or where manipulation occurs while laser head 27 lazes (as in step 10).

Step S9 is lasing at least a portion of area 17 using laser head 27 in drill head 11.

As discussed further, in some embodiments, laser head 27 may laze at least at least a portion of area 17 while drill head 11 is maneuvered (as in step S10), while laser head 27 is rastered (as in step S11), or both.

Some embodiments of the method may include step S10. Step S10 is maneuvering drill head 11 while lazing.

In some embodiments, drill head 11 may be maneuvered while laser head 27 lazes at least a portion of area 17. In some embodiments, maneuvering drill head 11 during lazing may increase the size of area 17 of formation 5 exposed to the laser. In some embodiments, this maneuvering may include one or more of rotation in theta Θ (as with rotational module 29), translation in x-y space or x-y-z space (as with articulation module 353), or advancing/retracting drill tool 11 in the z-direction (as with structures above surface 4 of wellbore 3).

Some embodiments of the method may not include step S10, such as those where drilling tool 1 lacks manipulation components (such as rotational module 29 or articulation module 353); those that include multiple laser heads 27 in drill head 11; those where laser head 27 rasters the laser during lazing, or those where lazing is performed from a static drill head 11 including those where lazing and maneuvering are performed in a stepwise fashion (meaning: maneuver, laze, maneuver, laze, and on).

Some embodiments of the method may include step S11. Step S11 is rastering laser head 27 while lazing.

In some embodiments, laser head 27 may be rastered while lazing. In some embodiments, laser head 27 may raster the laser in any shape or pattern. In some embodiments, this rastering may be performed by any structure within laser head 27. In some embodiments, rastering laser head 27 during lazing may increase the size of the portion of area 17 of formation 5 exposed to the laser.

Some embodiments of the method may not include step S11, such as those where laser head 27 is unable to raster the laser; those that include multiple laser heads 27 in drill head 11; those where drill head 11 is manipulated before or during lazing; or those where lazing is performed from a static drill head 11, including those where lazing and maneuvering are performed in a stepwise fashion (meaning: maneuver, laze, maneuver, laze, and on).

In some embodiments, steps S10 and S11 may be performed simultaneously. Thus, in some embodiments, laser head 27 may raster the laser while drill head 11 is being manipulated.

In some embodiments, one or more of steps S8, S9, S10, or S11 may be performed in any order. In some embodiments, one or more of steps S8, S9, S10, or S11 may be repeated in any order.

As an illustrative example, one or more embodiments of the method may involve: maneuvering drill head 11 so laser head 27 is directed towards area 17 (as in step S8); begin lazing from laser head 27 onto area 17 while drill head 11 is stationary (as in step S9); rastering laser head 27 while lazing at least a portion of area 17 (as in step S11); maneuvering drill head 11 so laser head 27 is directed towards a second area that has been introduced to the activating agent (as in step S8); begin lazing from laser head 27 onto at least a portion of the second area while drill head 11 is stationary (as in step S9); rastering laser head 27 while lazing a portion of the second area (as in step S11); and on.

As a second illustrative example, one or more embodiments of the method may involve: maneuvering drill head 11 so laser head 27 is directed towards area 17 (step S8), rotating drill head 11 in theta Θ while lazing (step S10), and rastering laser head 27 parallel to z-direction while lazing (step S11). Here, as in some embodiments, drill head 11 rotates while laser head 27 simultaneously rasters the laser, which may increase the size of the portion of area 17 that is lazed.

Thus, one having skill in the art will appreciate how any of steps S8, S9, S10, or S11 may be reordered, repeated, and/or combined to laze at least a portion of area 17 of formation 5 as desired for a given application.

Furthermore, in some embodiments, one or more of steps S4, S5, S6, S7, S8, S9, S10, or S11 may be performed in any order. In some embodiments, one or more of steps S4, S5, S6, S7, S8, S9, S10, or S11 may be repeated in any order.

In some embodiments, the method may include an alternating repetition of one or more steps of discharging the activating agent on an area 17 of formation 5 (as in steps S4, S5, S6 and/or S7) followed by one or more steps of lazing at least a portion of area 17 (as in steps S8, S9, S10, and/or S11).

In some embodiments, the method may include simultaneous lazing of at least a portion of a second area 455 that has been previously introduced to the activating agent (as in steps S8, S9, S10, and/or S11) and discharging the activating agent on a first area 417 of formation 5 that has not been previously introduced to the activating agent (as in steps S4, S5, S6 and/or S7). Some embodiments of drilling tool (such as drilling tool 401 depicted in FIG. 6) may be specifically designed for simultaneous lazing from laser head 27 and discharging from nozzle 21. Such embodiments may have multiple nozzle(s) 21/laser head(s) 27. Such embodiments may have include nozzle 21 and laser head 27 arranged to facilitate simultaneous discharging and lazing such as drilling tool 501 depicted in FIG. 6.

The method of use for some embodiments of drilling tool (such as drilling tool 501 depicted in FIG. 6) may simultaneously include: rotating according to arrow 33 (as with rotational module 29), lazing second area 455 (as in steps S8, S9, S10, and/or S11), discharging the activating agent on a first area 417 (as in steps S4, S5, S6 and/or S7), and translating in a z-direction according to arrow 457 (as with articulation module 353 or by advancing/retracting from wellbore 3). Such a spiraling manipulation combined with simultaneous discharge of the activating agent from nozzle 21 and lazing from laser head 27 may be one method for rapidly interacting with a large area of formation 5 within wellbore 3.

In view of the previous disclosures and examples, one having skill in the art will appreciate how any of steps S4, S5, S6, S7, S8, S9, S10, or S11 may be reordered, repeated, and/or combined to introduce the activating agent to area 17 and then laze at least a portion of area 17 of formation 5 as desired for a given application.

FIGS. 8A-8C and 9A-9C depict experimental results showing how lazing of a geologic sample is impacted by the addition an activating agent containing an activating material, both wet and dry. The incident beam for each experiment was a 1 kW laser and the sample was lazed for 30 seconds.

Figure 8A:
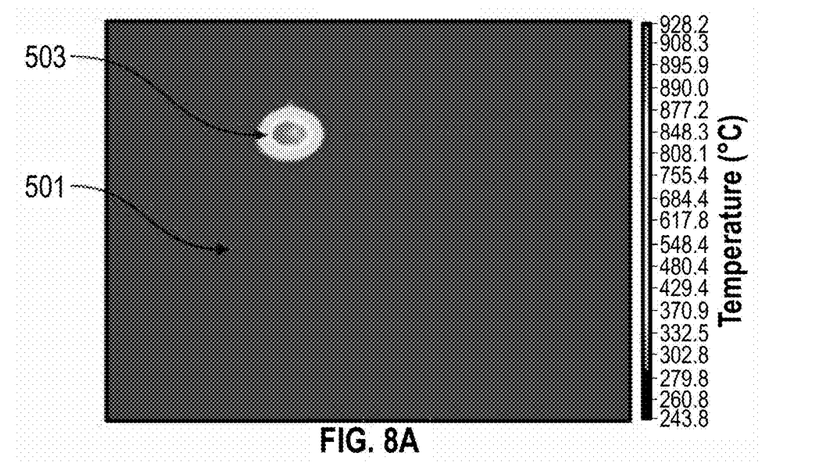
FIG. 8A-8C depict contour plots of the maximum temperature for three experiments performed according to one or more embodiments.
Figure 8B:
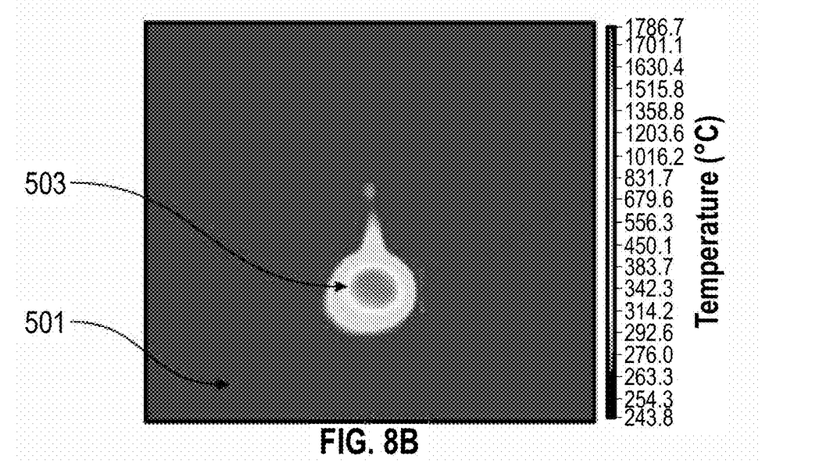
Figure 8C:
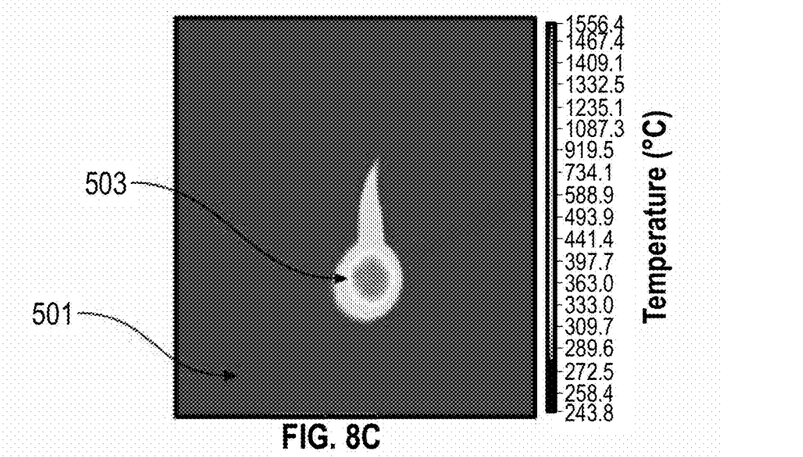
Figure 9A:
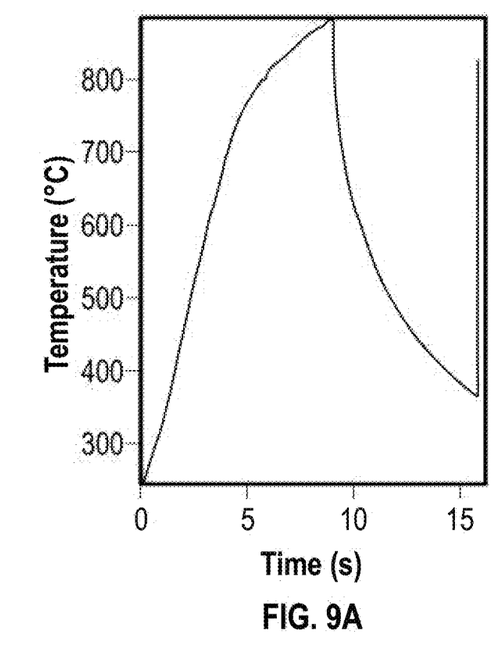
FIG. 9A-9C depict graphs of temperature as a function of time for three experiments performed according to one or more embodiments.
Figure 9B:
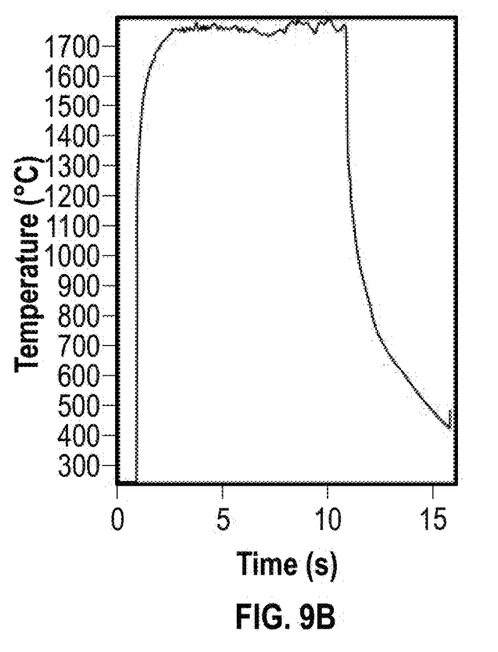
Figure 9C:
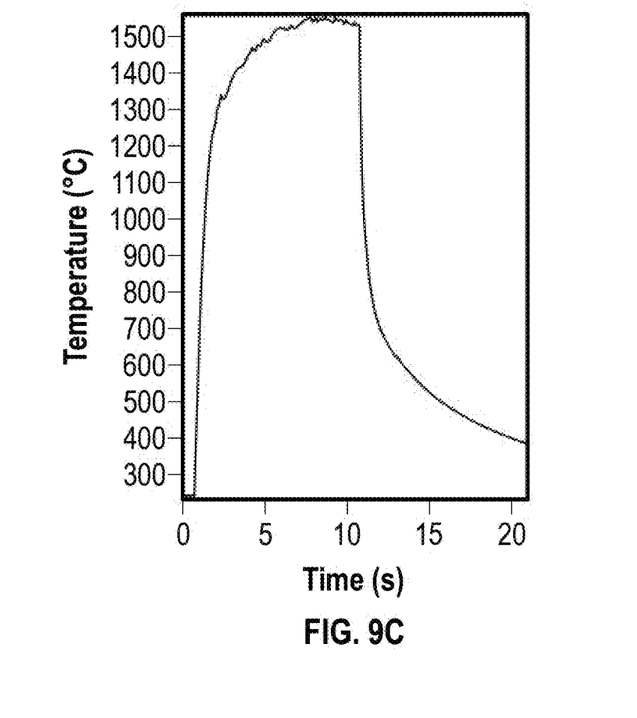

FIGS. 8A-8C are contour plots showing the maximum temperature (in ° C.) for each sample. An infrared camera captured the temperature of the sample including the incident spot of the laser. Areas of untreated rock sample 501 and areas of laser heating 503 are indicated. FIGS. 9A-9C are graphs of the temperature (in ° C.) as a function of elapsed time (in seconds). FIGS. 9A-9C were created using with the same infrared camera data plotted in FIGS. 8A-8C for each sample.

FIGS. 8A and 9A reflect a control sample comprising a geologic sample (a block of limestone) without an activating agent. As seen in FIG. 9A, the maximum temperature of the limestone control is 888° C. Additionally, FIG. 8A shows the laser heated a smaller spatial region than seen in FIGS. 8B and 8C.

FIGS. 8B and 9B reflect a similar block of limestone topped with dry activated carbon (the activating material). First, the heated region in FIG. 8B is more than four times larger than the heated region in FIG. 8A for of a sample without activated carbon. Additionally, the maximum temperature of the limestone with the activated carbon is 1795° C., which is more than double the maximum temperature for a sample without activated carbon as seen in FIG. 9A. Further, with activated carbon, the limestone reaches the maximum temperature in less than 1.75 seconds, compared to 8.75 seconds for the sample without activated carbon. Finally, after reaching the maximum temperature, the activated carbon sample essentially maintains this temperature for more than 8 seconds compared with less than 0.25 seconds for the control.

FIGS. 8C and 9C reflect the impacts of the laser on a similar block of limestone coated with a mixture of activated carbon (the activating material) and water (such as might be used in a carrying fluid or a transport fluid). The heated area in FIG. 8C is similarly sized to that of the dry activated carbon as shown in FIG. 8B, and both are much larger than the control as depicted in FIG. 8A. After laser exposure, the maximum temperature of the limestone, activated carbon, and water is 1565° C., which is slightly less than the maximum temperature for the dry activated carbon (1795° C.) but still much higher than the maximum temperature for the control (888° C.). Similarly, the maximum temperature for the sample in FIG. 9C is reached in 6.5 seconds, which is slower than the dry activated carbon (1.75 seconds) but faster than the control (8.75 seconds). Finally, in FIG. 9C, the maximum temperature is essentially maintained for about 2.5 seconds, which is shorter than the dry activated carbon (8 seconds) but longer than the control (less than 0.25 seconds).

The results depicted in FIGS. 8A-8C and 9A-9C confirm that either wet or dry activated carbon increase the maximum rock temperature by at least 1.75 times compared with limestone without activated carbon. Furthermore, these experiments prove activated carbon significantly improves the heat transfer into limestone for a 1 kW laser, which is a much lower powered laser than is typically used for wellbore stimulation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A drilling tool for drilling in a formation, the drilling tool comprising:
an optical fiber having a laser input end and a laser output end;
a laser source optically connected to the laser input end;
an activating agent conduit having an activating agent inlet and an activating agent outlet;
an activating agent source connected to the activating agent inlet that supplies an activating agent; and
a drill head, comprising:
a nozzle connected to the activating agent outlet that discharges the activating agent on an area of the formation, and
a laser head optically connected to the laser output end and arranged to lase at least a portion of the area of the formation having the activating agent,
wherein the activating agent comprises an activating material, the activating material comprising at least one of activated carbon, graphite, carbon black, carbon nanotubes, nanoparticles, paint, dye, molybdenum disulfide, a transition metal chalcogenide, or a metamaterial.

2. The drilling tool of claim 1, wherein the activating agent increases energy absorption of the portion of the area of the formation when lased.

3. The drilling tool of claim 1, wherein the activating agent comprises an activating material having at least one of a dark color, a high porosity, a high surface area, a small particle size, a high optical absorption, or a low optical reflectivity.

4. The drilling tool of claim 1, wherein the activating agent further comprises a transport fluid, such that the transport fluid and the activating material are mixed prior to entering the activating agent inlet.

5. The drilling tool of claim 4, wherein the transport fluid comprises at least one of water, brine, liquid adhesive, surfactant, acetone, ethanol, methanol, or isopropanol.

6. The drilling tool of claim 1, further comprising:
a carrying fluid conduit having a carrying fluid inlet and a carrying fluid outlet; and
a carrying fluid source connected to the carrying fluid inlet that supplies a carrying fluid that carries the activating agent out the nozzle.

7. The drilling tool of claim 6, wherein the carrying fluid comprises at least one of air, nitrogen, oxygen, argon, water, brine, liquid adhesive, surfactant, acetone, ethanol, methanol, or isopropanol.

8. The drilling tool of claim 1, wherein the drill head further comprises an articulation module configured to direct the nozzle and the laser head toward the area of the formation.

9. The drilling tool of claim 1, wherein the drill head further comprises a rotational module configured to direct the nozzle and the laser head toward the area of the formation.

10. The drilling tool of claim 9, wherein the rotational module has an axis of rotation that lies in a plane dividing the drill head into a first half and a second half; and
   the nozzle is disposed on the first half, and wherein the laser is disposed on the second half.

11. A method for drilling in a formation using an activating agent and a laser, the method comprising:
   inserting a drill head into a wellbore;
   advancing the drill head to an area of the formation;
   discharging an activating agent on the area of the formation using a nozzle in the drill head; and
   lasing at least a portion of the area of the formation using a laser head in the drill head,
   wherein the activating agent comprises an activating material, the activating material comprising at least one of activated carbon, graphite, carbon black, carbon nanotubes, nanoparticles, paint, dye, molybdenum disulfide, a transition metal chalcogenide, or a metamaterial.

12. The method of claim 11, further comprising maneuvering the drill head so the nozzle is directed toward the area of the formation.

13. The method of claim 11, wherein discharging the activating agent further comprises rastering the nozzle while discharging the activating agent from the nozzle.

14. The method of claim 11, wherein discharging the activating agent further comprises maneuvering the drill head.

15. The method of claim 11, further comprising maneuvering the drill head so the laser head is directed toward the area of the formation.

16. The method of claim 11, wherein lasing at least the portion of the area of the formation further comprises rastering the laser head while lasing.

17. The method of claim 11, wherein lasing at least the portion of the area of the formation further comprises maneuvering the drill head.

18. The method of claim 11, further comprising supplying a carrying fluid to an activating agent source located in a vicinity of the drill head such that the carrying fluid carries the activating agent from the activating agent source out the nozzle.

19. The method of claim 11, further comprising supplying a carrying fluid to an intermediate opening defined in an activating agent conduit such that the carrying fluid carries the activating agent from proximate to the intermediate opening out the nozzle.

* * * * *